United States Patent
Wang

(10) Patent No.: US 12,493,847 B2
(45) Date of Patent: Dec. 9, 2025

(54) METHOD, APPARATUS, AND ELECTRONIC DEVICE FOR PROCESSING PRODUCT TRACEABILITY CHAIN INFORMATION

(71) Applicant: Alibaba Group Holding Limited, Grand Cayman (KY)

(72) Inventor: Kang Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 580 days.

(21) Appl. No.: 17/058,955

(22) PCT Filed: May 24, 2019

(86) PCT No.: PCT/CN2019/088245
§ 371 (c)(1),
(2) Date: Nov. 25, 2020

(87) PCT Pub. No.: WO2019/233289
PCT Pub. Date: Dec. 12, 2019

(65) Prior Publication Data
US 2021/0216961 A1    Jul. 15, 2021

(30) Foreign Application Priority Data

Jun. 7, 2018 (CN) .................. 201810580597.X

(51) Int. Cl.
*G06Q 10/0833* (2023.01)
*H04N 21/8549* (2011.01)

(52) U.S. Cl.
CPC ..... *G06Q 10/0833* (2013.01); *H04N 21/8549* (2013.01)

(58) Field of Classification Search
CPC .................. G06Q 10/0833; H04N 21/8549
(Continued)

(56) References Cited

U.S. PATENT DOCUMENTS

| 5,939,974 A | 8/1999 | Heagle et al. |
| 6,342,839 B1 | 1/2002 | Curkendall et al. |

(Continued)

FOREIGN PATENT DOCUMENTS

| CN | 103248872 A | 8/2013 |
| CN | 103886510 A | 6/2014 |

(Continued)

OTHER PUBLICATIONS

M. Chamekh, S. E. Asmi, M. Hamdi and T. - H. Kim, "IoT Based Tracking System For Supply Chain Management," 2018 6th International Conference on Wireless Networks and Mobile Communications (WINCOM), Marrakesh, Morocco, 2018, pp. 1-5. (Year: 2018).*

(Continued)

*Primary Examiner* — Jeff Zimmerman
*Assistant Examiner* — Hunter Molnar
(74) *Attorney, Agent, or Firm* — James J. DeCarlo; Greenberg Traurig, LLP

(57) ABSTRACT

Embodiments of the disclosure provide methods, apparatuses, and electronic devices for processing product traceability chain information. The method comprises: determining one or more processing stages associated with a traceability chain of a product; acquiring video information associated with each of the one or more processing stages of the traceability chain; and splicing the video information associated with each of the one or more processing stages to generate a traceability video for the product.

17 Claims, 11 Drawing Sheets

(58) Field of Classification Search
USPC .......................................................... 705/333
See application file for complete search history.

(56) References Cited

U.S. PATENT DOCUMENTS

| | | | |
|---|---|---|---|
| 6,691,135 | B2 | 2/2004 | Pickett et al. |
| 10,176,481 | B2 | 1/2019 | Aljawhari |
| 10,395,207 | B2 | 8/2019 | Jung et al. |
| 10,530,584 | B2 | 1/2020 | Kovach et al. |
| 2002/0082982 | A1 | 6/2002 | Mock et al. |
| 2002/0091593 | A1 | 7/2002 | Fowler |
| 2002/0095232 | A1 | 7/2002 | Jorgenson et al. |
| 2003/0177025 | A1 | 9/2003 | Curkendall et al. |
| 2006/0187048 | A1 | 8/2006 | Curkendall et al. |
| 2007/0175981 | A1 | 8/2007 | Chen et al. |
| 2009/0254460 | A1* | 10/2009 | Farmer ................ G06Q 10/087 705/28 |
| 2011/0093113 | A1 | 4/2011 | Sager et al. |
| 2014/0121810 | A1 | 5/2014 | Jung et al. |
| 2014/0122488 | A1 | 5/2014 | Jung et al. |
| 2014/0129383 | A1* | 5/2014 | Farmer .............. G06Q 30/0609 705/26.35 |
| 2014/0367463 | A1* | 12/2014 | Cibor ................ G06Q 10/0833 235/375 |
| 2015/0221021 | A1* | 8/2015 | Shakes ................... G06Q 10/08 705/26.81 |
| 2016/0007069 | A1* | 1/2016 | Krechman ......... H04N 21/4722 725/32 |
| 2016/0034847 | A1* | 2/2016 | West .................... G11B 31/006 386/228 |
| 2016/0171439 | A1* | 6/2016 | Ladden ................ G06Q 10/083 705/340 |
| 2017/0293882 | A1 | 10/2017 | Beier et al. |
| 2018/0181909 | A1* | 6/2018 | Wilkinson .......... G06F 16/7867 |
| 2019/0087870 | A1* | 3/2019 | Gardyne ............ H04N 21/2743 |
| 2019/0392386 | A1* | 12/2019 | Wilkinson ......... G06Q 10/0833 |

FOREIGN PATENT DOCUMENTS

| | | | |
|---|---|---|---|
| CN | 103996101 | A | 8/2014 |
| CN | 105493512 | A | 4/2016 |
| CN | 105812722 | A * | 7/2016 |
| CN | 106910076 | A | 6/2017 |
| CN | 107734277 | A | 2/2018 |
| CN | 107948561 | A | 4/2018 |

OTHER PUBLICATIONS

International Search Report to corresponding International Application No. PCT/CN2019/088245 Mailed Sep. 2, 2019 (2 pages).

* cited by examiner

METHOD, APPARATUS, AND ELECTRONIC DEVICE FOR PROCESSING PRODUCT TRACEABILITY CHAIN INFORMATION

CROSS-REFERENCE TO RELATED APPLICATIONS

The present application is a national stage entry of Int'l Appl. No. PCT/CN2019/088245, filed on May 24, 2019, which claims the benefit of priority to Chinese Patent Application No. 201810580597.X, filed on Jun. 7, 2018, both of which are incorporated herein by reference in their entirety.

BACKGROUND

Technical Field

The present application relates to the field of computer technologies, and in particular to methods, apparatuses, and electronic devices for processing product traceability chain information.

Description of Related Art

Presently, upstream supply chain systems in agriculture are built mainly around procurement, product selection, quality control, and logistics links. It is through the strengthening of the quality standards of products that consumers' trust in agricultural products is increased. A traceability system is at the heart of establishing quality standards. The entire traceability system is responsible for connecting upstream service chains in series, converting all backends into consumer experiences (source selection+preservation and direct supply+full-chain traceability), and promoting normalization and standardization at various business nodes of the upstream supply chain system.

In the traditional agricultural product traceability system, relevant content is often presented in the form of text and images, not imposing strong impressions on consumers. Some Internet products are displayed by capturing an entire promotional video, which has publicizing effects but is poor in authenticity and interaction. A fatal disadvantage lies in that the video is not customized based on the products purchased by consumers, resulting in the content of the video that consumers watch being the same, lacking authenticity.

SUMMARY

The disclosure provides methods, apparatuses, and electronic devices for processing agricultural product traceability chain information to furnish traceability chain information of the corresponding product in a customized manner based on a product purchased by a consumer, thereby improving the authenticity and appeal of the product.

To achieve the objective set out above, embodiments of the disclosure provide the following technical solutions.

In one embodiment, the disclosure provides a method for processing product traceability chain information, the method comprising: acquiring one or both of pertinent image information and pertinent video information at each processing stage of a traceability chain associated with a product; and splicing the one or both of pertinent image information and pertinent video information at each processing stage of the traceability chain associated with the product to generate a traceability video for the product.

In one embodiment, the disclosure provides a method for processing product traceability chain information, the method comprising: receiving, from a client, a playback request for a traceability video associated with a product; and transmitting, based on the playback request, to the client a traceability video pre-captured for the traceability chain information associated with the product, the traceability video to be played at the client.

In one embodiment, the disclosure provides an apparatus for processing product traceability chain information, the apparatus comprising: a video acquiring module configured to acquire one or both of pertinent image and pertinent video information at each processing stage of a traceability chain associated with a product; and a video splicing module configured to splice the one or both of the pertinent image information and pertinent video information at each processing stage of the traceability chain associated with the product to generate a traceability video for the product.

In one embodiment, the disclosure provides an apparatus for processing product traceability chain information, the apparatus comprising: a request receiving module configured to receive, from a client, a playback request for a traceability video associated with a product; and a video transmitting module configured to transmit, based on the playback request, to the client a traceability video pre-captured for the traceability chain information associated with the product, the traceability video to be played at the client.

In one embodiment, the disclosure provides an electronic device, the electronic device comprising: a memory and a processor coupled to the memory, wherein the memory is configured to store a program, when executed by the processor, instructing the electronic device to acquire one or both of pertinent image and pertinent video information at each processing stage of a traceability chain associated with a product; and splice the one or both pertinent image information and pertinent video information at each processing stage of the traceability chain associated with the product to generate a traceability video for the product.

In one embodiment, the disclosure provides an electronic device, the electronic device comprising: a memory and a processor coupled to the memory, wherein the memory is configured to store a program, when executed by the processor, instructing the electronic device to receive a playback request, from a client, for a traceability video associated with a product; and transmit, based on the playback request, to the client a traceability video pre-captured for traceability chain information associated with the product, the traceability video to be played at the client.

With the methods, apparatuses, and electronic devices for processing product traceability chain information provided by the disclosure, a consumer can send to a server a playback request for a traceability video associated with a product via a client, and the server automatically matches a customized traceability video for the product based on the received video playback request and transmits the customized traceability video to the corresponding client for playing. The solution provides the traceability chain information for the product in a customized manner based on the corresponding product purchased by the consumer, thereby improving the authenticity and appeal of the product.

The above description is merely an overview of the technical solutions of the disclosure. In order for people skilled in the art to better understand the technical aspects of the disclosure so that the technical solutions may be implemented more clearly and easily, the above description, other objectives, features, and advantages of the disclosure are illustrated in the following, in which embodiments of the disclosure are described.

BRIEF DESCRIPTION OF THE DRAWINGS

To further explain the advantages and benefits, detailed descriptions of some embodiments of the disclosure are illustrated in the following. The drawings are used for illustrating some embodiments only and are not to limit the disclosure.

DETAILED DESCRIPTION OF THE EMBODIMENTS

Figure 1:
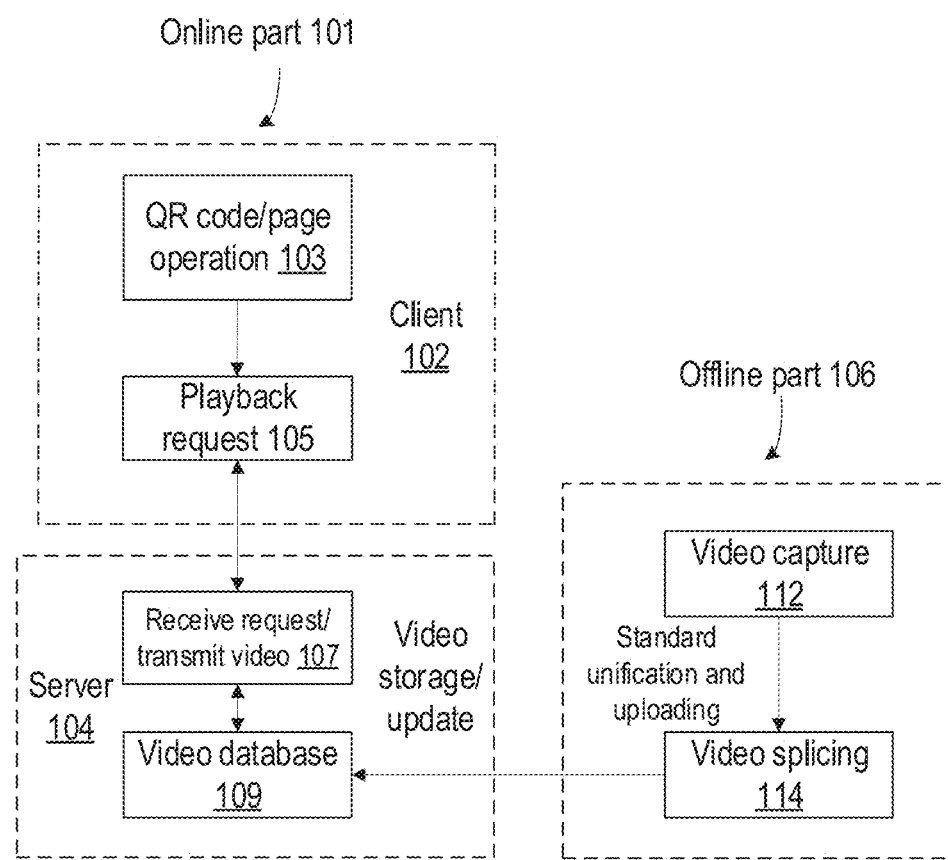
FIG. 1 is a schematic diagram illustrating a system for processing product traceability chain information according to some embodiments of the disclosure.

Exemplary embodiments of the disclosure will be described below in more detail with reference to the accompanying drawings. The accompanying drawings describe exemplary embodiments of the disclosure. It should be understood that the disclosure may be implemented in various forms and should not be limited by the embodiments described herein. Instead, these embodiments are provided so that the disclosure will be better understood, and the scope of the present disclosure can be conveyed to those skilled in the art.

Embodiments of the disclosure provide the technical solution involving the following concepts.

As used herein, a product traceability chain refers to a chain comprising all links that a product goes through from the early stages of manufacturing and processing to later stages of sales and logistics operations.

As used herein, traceability chain information refers to the product information at various processing stages of a traceability chain. Such information includes, for example, product manufacturing information, product testing information, manufacturing facility information, manufacturing business information, and logistics information. The product manufacturing information may include the product name, manufacturing business, brand, grade, batch number, manufacture date, and expiration date of the product. The product testing information may include the time, institution, operator, and specifications of the test. The manufacturing facility information may include the name, address, type, area size, and environmental conditions of the facility. The manufacturing business information may include the name, main products, organization code, and contact information of the manufacturer. The logistics information may include the logistics company name, waybill number, and dispatcher information.

As used herein, a traceability video refers to a video capturing all or part of traceability chain information in the format of a video.

As used herein, a traceability video query code refers to a string of unique identifiers of a plurality of digits, characters, and symbols, each string corresponding to a unique traceability video. In one example, a consumer sends a video playback request for a designated product to a client by inputting such a string at a specified position.

Presently, a traditional product tracing method typically shows traceability chain information in a combination of texts and images. A consumer may view a traceability video query code in the product details portion on a webpage of an online store where a product is sold and information associated with the specific processing stages such as manufacturing and processing of the product. However, such a display is monotonous in the form and relatively incomplete in the content, resulting in poor consumer experience.

Addressing the limitations in displaying product traceability chain information in the current technologies, the disclosure provides methods, apparatuses, and electronic devices for processing product traceability chain information. The concept of the disclosure lies in that a consumer can send to a server a playback request for a traceability video associated with a product via a client, and the server automatically matches a customized traceability video for the product based on the received video playback request and returns the traceability video to the client for playing. Embodiment of the disclosure provides the traceability chain information for the product in a customized manner based on the corresponding product purchased by the consumer, thereby improving the authenticity and appeal of the product.

FIG. 1 is a schematic diagram illustrating a system for processing product traceability chain information according to some embodiments of the disclosure. In some embodiments and as shown in FIG. 1, the product traceability chain information processing system is divided into two parts: an offline part (106) and an online part (101).

As illustrated, the offline part (106) (e.g., a preparation stage) focuses primarily on video capture of the product in various links on a traceability chain. During video capture (112), traceability chain information is first divided by a plurality of processing stages based on the key nodes in the traceability chain. For example, for a traceability chain for a fruit product, the traceability chain information of the fruit product is divided into information associated with a planting stage, a processing stage, a warehousing stage, and a logistics stage based on the key nodes on the chain (e.g., planting, fertilization, harvesting, admission, screening, packaging, storage, inspection, packing, and shipping). Then, the traceability chain information of the product is captured in the stages to generate a plurality of short videos corresponding to the various processing stages of the product. Such short videos are spliced together (114) to generate a traceability video, which is stored in a video database (109) for use by a server (104).

In some embodiments, for each processing stage of a product in a traceability chain, a dedicated person in charge, or a specialized capturing device, is designated to capture the video. The video captured at each stage includes mainly the traceability chain information at that stage. To reduce costs in the later video editing and improve the displaying effects of the videos, capturing rules are pre-configured before the videos are captured. Non-limiting examples include parameters such as brightness, filter, video format, video length, file size, and the like. As such, it is ensured that the videos captured at various stages of the traceability chain are of unified standards and can be integrated by simple splicing operations. In one example, videos from various processing stages of the same product are spliced into a complete traceability video in the sequential order of the stages. In another example, to improve the spectator-appealing value of the traceability video, a preset opening and/or closing are further automatically added to the traceability video.

The online part (101) (e.g., a processing process of the traceability chain information) comprises a server (104) and a client (102). In some embodiments, the server (104) provides, based on a video playback request from a consumer, a customized traceability video to the consumer for playing at the client (102).

In implementations, the consumer who intends to view a traceability video of a designated product sends a video playback request to the server (104) in a variety of ways. In one example, the consumer clicks (103) a PLAY button associated with the traceability video of the product on a browser page, or a product ordering page at the client (102), or scans (103) a quick response (QR) code associated with the traceability video of the designated product, or directly input a traceability video query code for the current product at the client (102). Next, in response to the consumer's request, the client (102) sends the request (105) to the server (104). The server (104) automatically matches a traceability video corresponding to the product and sends (107) the video to the client (102) for playing. Compared with the present technologies, the disclosure provides a traceability video for a designated product in a customized manner based on a request from a consumer. Further, the content of the traceability video includes the traceability chain information targeting the product, thereby providing a more authentic and reliable interaction experience for the consumer.

Figure 2:
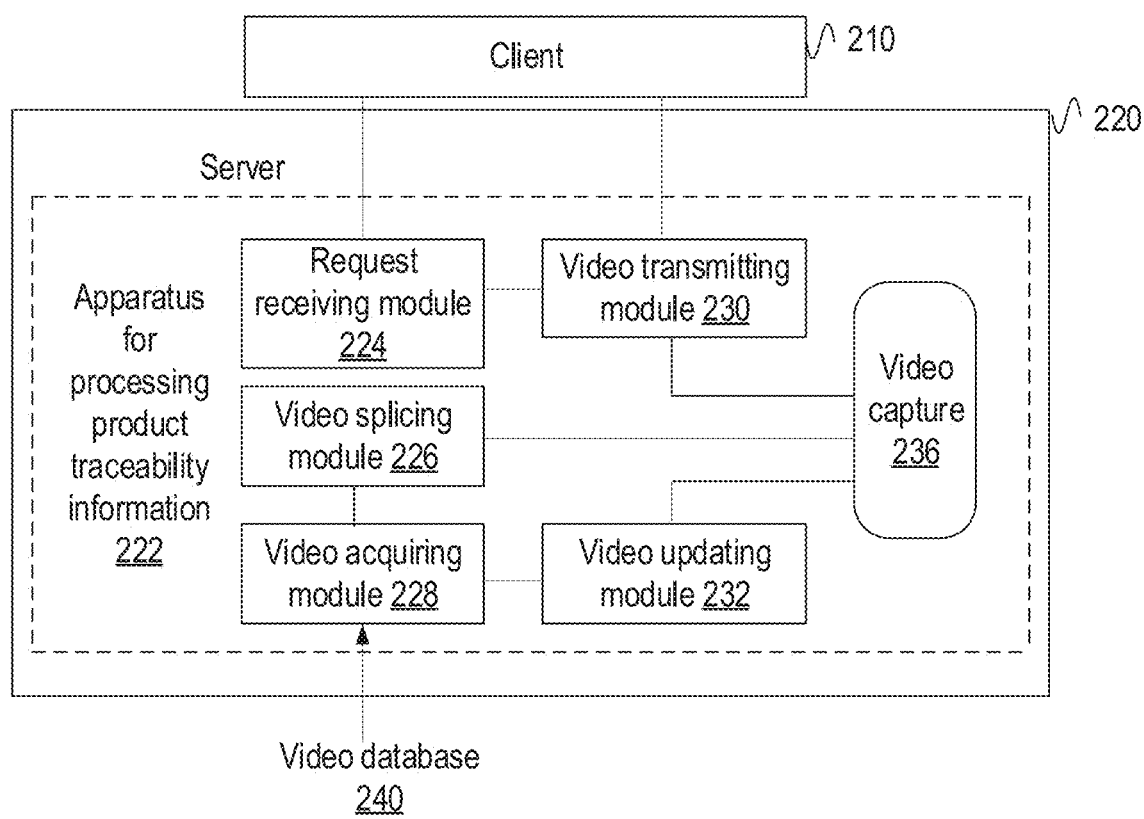
FIG. 2 is a schematic diagram illustrating a system for processing product traceability chain information according to some embodiments of the disclosure.

FIG. 2 is a schematic diagram illustrating a system for processing product traceability chain information according to some embodiments of the disclosure. In some embodiments and as shown in FIG. 2, the system comprises a client (210) and a server (220).

In this embodiment, the client (210) includes a shopping website implemented via a web page or a shopping application installed on a computer or a mobile phone.

In this embodiment, the server (220) includes a backend server corresponding to the client (210). In some embodiments, the server (220) is configured to execute the logical procedures processed by the server (104) in FIG. 1. Here, the server (220) comprises a product traceability information processing apparatus (222) and a video database (240) configured to store traceability videos. The product traceability information processing apparatus (222) comprises a request receiving module (224), a video transmitting module (230), a video acquiring module (228), a video splicing module (226), and a video updating module (232).

In some embodiments, the request receiving module (224) is configured to receive a playback request, from a client, for a traceability video of a designated product.

In some embodiments, the video transmitting module (230) is configured to transmit, based on the playback request, to the client a traceability video pre-captured for traceability chain information of the designated product, the traceability video to be played at the client.

In some embodiments, the video acquiring module (228) is configured to acquire one or both of pertinent image information and pertinent video information at each processing stage of the traceability chain of the designated product.

In some embodiments, the video splicing module (226) is configured to splice the pertinent image and/or pertinent video information at each processing stage of the traceability chain of the designated product to generate the traceability video for the designated product.

In some embodiments, the video updating module (232) is configured to periodically generate a traceability video for the designated product and update the traceability video in use.

In some implementations, a dedicated person in charge of each respective processing stage, or a specialized capturing device capable of automatically capturing videos at each respective processing stage, in the product traceability chain, captures images and/or videos (236) for the product traceability chain information. Next, the images and/or videos are uploaded to the video acquiring module (228). The video acquiring module (228) acquires the images and/or short videos for the product at the various processing stages. The video splicing module (226) splices the images and/or short videos for the product at the various processing stages, performs post-production operations on the images and/or videos, and adds, for example, an opening and a closing to generate a customized product traceability video. Subsequently, the traceability video is stored in a video database (240). The client (210) sends, in response to the video playback request from the consumer, the request to the request receiving module (224) of the server (220). The video transmitting module (230) extracts the traceability video for the designated product from the video database (240) based on the received video playback request and transmits the traceability video to the client (210) for playing. The video updating module (232) is configured to periodically generate a traceability video for the designated product and update the traceability video in use.

Figure 3:
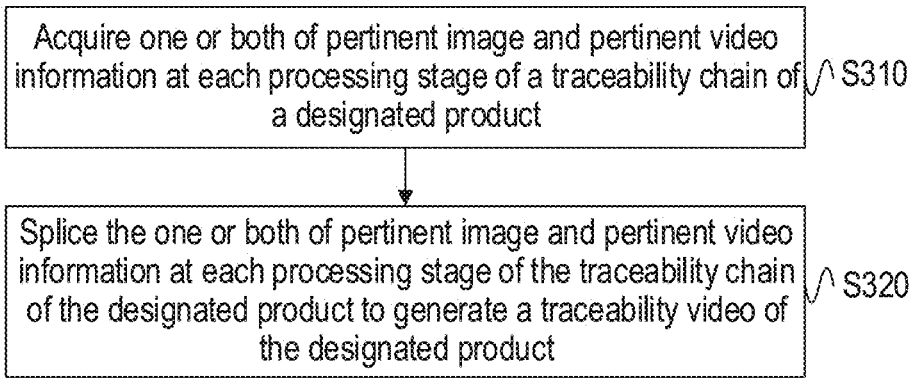
FIG. 3 is a flow diagram illustrating a method for processing product traceability chain information according to some embodiments of the disclosure.

FIG. 3 is a flow diagram illustrating a method for processing product traceability chain information according to some embodiments of the disclosure. In some embodiments, the method is executed at the server 220 of FIG. 2, or an apparatus that is provided at the server and configured to process product traceability chain information. In one embodiment and as shown in FIG. 3, the method for processing product traceability chain information comprises the following steps.

Step S310: acquire one or both of pertinent image information and pertinent video information at each processing stage of a traceability chain associated with a designated product.

In some embodiments, as the different processing stages in traceability chains corresponding to different categories of products, the traceability chain information of the products is divided by the processing stages based on the product categories. In one example, a traceability chain associated with a fruit product is divided into a planting stage, a processing stage, a warehousing stage, and a logistics stage, based on the processing procedure thereof. Based on the division of the product chain information, pertinent images and/or videos are captured in the stages to generate images and/or short videos for each respective processing stage. This way, images and/or video information (e.g., short videos) are acquired for each processing stage associated with the corresponding traceability chain of the designated product.

In some embodiments, images and/or videos captured by a responsible entity at each respective processing stage of the designated product and meeting a preset capturing rule are received.

In some embodiments, the responsible entity includes, but is not limited to, a person in charge or a capturing device capable of automatically performing capture. In an exemplary capturing process, one or more responsible entities are assigned to each processing stage. In some examples, the preset capturing rule includes parameters such as brightness, filter, image and/or video format, video length, file size, and so on. As such, it is ensured that the videos captured at the various stages of the traceability chain are of a unified format and can be integrated by simple splicing operations to reduce costs. In other examples, a unified image and/or video capture template is provided for repeated use directly during the image and/or video capture, ensuring the consistency in video splicing at later processing stages, thus improving the quality of the traceability video.

Step S320: splice one or both of pertinent image information and pertinent video information at each processing stage of the traceability chain of the designated product to generate a traceability video for the designated product.

In some embodiments, the processing stages of the product on the traceability chain are divided in temporal order. In one example, a traceability chain of a fruit product is divided into a planting stage, a processing stage, a warehousing stage, and a logistics stage. As such, images and/or videos are spliced based on the order of the stages to generate a video, including, in sequential order, planting stage image and/video information, processing stage image and/or video information, warehousing stage image and/or video information, and logistics stage image and/or video information. The pertinent image and/or video information at the various processing stages of the designated product is spliced into a complete video, which is a customized traceability video for the designated product. In some examples, in the process of traceability video splicing, the images and videos are separately spliced (splicing the images into a whole image and splicing the videos into a whole video) to form a traceability video. In other examples, the images and videos are spliced together into a whole content item to generate a traceability video. As such, the solution provides consumers with customized traceability videos for products they clicked on or purchased, thus increasing the trust of the consumers in the products and improving the impression of the brands upon the consumers.

In some embodiments, a preset traceability opening and closing are added to the video generated by splicing the pertinent image and/or video information of the designated product at each processing stage to generate the traceability video. This way, the completeness and spectator-appealing value of the traceability video is further improved by adding the preset opening and closing to the traceability video.

In one example, a poster of the product is used as the opening in the traceability video; and derivative product(s) (e.g., a cake made with the fruit product) of the product is used as the closing in the traceability video to further impress upon the consumers with an overall impression of the product.

According to various embodiments of the disclosure, the method for processing product traceability chain information divides a product traceability chain by processing stages, separately captures an image and/or video at each stage, and subsequently generates a complete customized traceability video by splicing. Further, in some embodiments, a preset capturing rule is adopted for the images and/or videos at various stages. In other embodiments, a preset opening and closing are added to the traceability video. As such, unification and standardization in the videos are achieved, reducing costs, and improving the completeness and spectator-appealing value for the traceability video.

Figure 4:
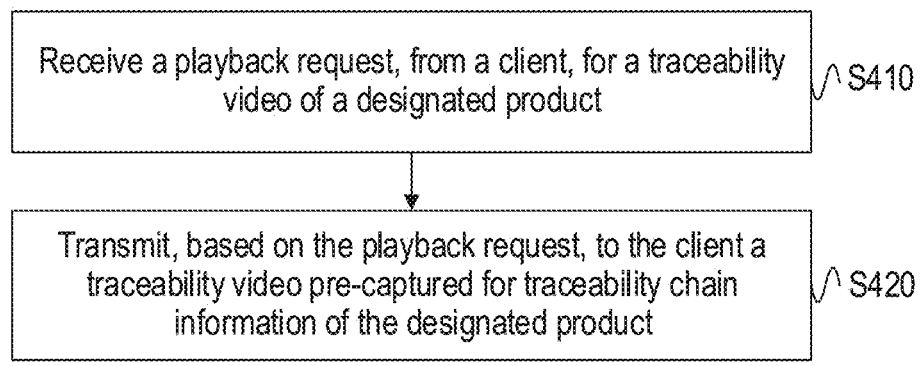
FIG. 4 is a flow diagram illustrating a method for processing product traceability chain information according to some embodiments of the disclosure.

FIG. 4 is a flow diagram illustrating a method for processing product traceability chain information according to some embodiments of the disclosure. In some embodiments, the method is executed at the server (220) of FIG. 2, or an apparatus that is provided in the server and configured to process product traceability chain information. In some embodiments, and as shown in FIG. 4, the method for processing product traceability chain information comprises the following steps.

Step S410: receive a playback request, from a client, for a traceability video of a designated product.

In implementations, when browsing a product display page of a webpage or on a client, or has purchased a product, the consumer sends a traceability video playback request for the designated product in various manners. For example, the manners include, but not limited to, clicking on a video play button, scanning a QR code or a barcode, or inputting a traceability video query code. The client, in response to the video playback request from the consumer, sends the request to the server. As used herein, the product includes, but not limited to, agricultural products, household products, sporting and office supplies, hardware and electric appliances, and the like.

Step S420: transmit, based on the playback request, to the client a traceability video pre-captured for traceability chain information of the designated product.

In some embodiments, the traceability chain information of the product includes the product processing information at various stages in a chain of all links a product goes through, from the early stages of manufacturing and processing to later stages of sales and logistics. The traceability video includes all or part of traceability chain information that is captured in the form of a video. Traceability videos of a variety of products are pre-captured and stored in the server. When the server receives a playback request for a traceability video of a designated product from the client, the server automatically matches a traceability video corresponding to the product in a video database based on the playback request and transmits the traceability video to the client for playing.

In implementations, the traceability video is generated in a variety of ways. In one example, a responsible entity is pre-designated for a product, and the responsible entity is responsible for tracking and capturing the whole process of the traceability chain associated with the product to generate a complete traceability video directly. Alternatively, the traceability chain is divided by processing stages based on the key node information in the traceability chain of the product. This way, a plurality of responsible entities are pre-designated to capture images/videos at different stages of the product, based on which a complete traceability video is generated in post-production.

Further, to improve the targeting pertinence of traceability videos, a traceability video finally played at the client may display the complete traceability chain information, or only part of the traceability chain information, based on consumers' different concerns for different types of products. For example, for a fruit product, consumers are more inclined to pay attention to the traceability chain information at the planting and processing stages to ensure that the product is natural and free of contamination. While for a clothing product, consumers are more inclined to pay attention to the design and manufacturing stages to ensure that the style meets personal aesthetics and the materials meet the requirements of the consumers in terms of quality. In the latter example, compared with the style and materials, the consumers may not care too much about the cultivation and processing of the raw materials. Therefore, for different categories of products, focuses on the contents of traceability videos is adjusted flexibly.

According to embodiments of the disclosure, with the method for processing product traceability chain information, a consumer sends to a server a playback request for a traceability video of a product via a client; and the server automatically matches a customized traceability video for the product based on the received video playback request and transmits the traceability video to the corresponding client for playing. This way, the traceability chain information of the corresponding product is provided in a customized manner based on the product purchased by the consumer, thereby improving the authenticity and appeal of the product.

Figure 5:
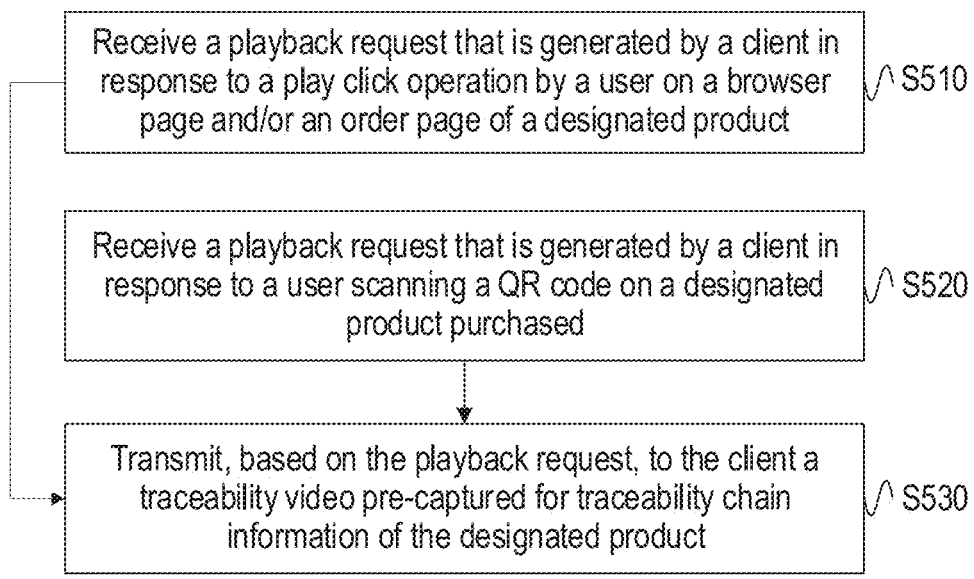
FIG. 5 is a flow diagram illustrating a method for processing product traceability chain information according to some embodiments of the disclosure.

FIG. 5 is a flow diagram illustrating a method for processing product traceability chain information according to some embodiments of the disclosure. Based on the embodiments illustrated in FIG. 4, the form and trigger timing for the traceability video playback request are further illustrated herein. In some embodiments and as shown in FIG. 5, the method for processing product traceability chain information comprises the following steps.

Step S510: receive a playback request generated by a client and in response to a playback operation (e.g., click to play) by a user on a browser page and/or an order page associated with a designated product.

In some embodiments, a consumer browses a product display page or a product order page via the client. The client may include a webpage or an application executing on a computer or a mobile phone. In one example, when the consumer is interested in the traceability chain information of a product and desires to further learn about the product, he/she clicks a "video playback" button provided on the client to trigger a video playing back operation at the client. The client sends, in response to the video playback request, the request to a background server such that the server receives the video playback request.

In other embodiments, the method may comprise the following step.

Step S520: receive a playback request that is generated by a client in response to a user scanning a QR code on a designated product purchased.

In some embodiments, when a consumer has purchased a product, he/she sends a traceability video playback request for the product to the client by scanning the QR code on the product. In this case, the QR code serves as a unique identifier, corresponding to a unique traceability video, which further corresponds to one product or a category of products.

In implementations, a manufacturer prints or pastes a QR code corresponding to a traceability video for a product on the package of the product or the logistical package of the product. In one example, when a consumer purchases or receives the product through logistics distribution, he/she scans the QR code to send a video playback request directly to the client. In another example, the consumer scans the QR code to access a human-computer interaction page to send a video playback request to the client via operations such as a click, and in turn, watches a customized traceability video for the product purchased.

The following step S530 is performed after step S510 and/or step S520 are performed.

Step S530: transmit, based on the playback request, to the client a traceability video pre-captured for the traceability chain information associated with the designated product for playing at the client.

In some embodiments, step S530 is substantially similar to the above-described step S420 in terms of contents.

In some embodiments, in performing the method according to this embodiment, the traceability video is generated via the embodiments described in FIG. 3.

According to embodiments of the disclosure, with the method for processing product traceability chain information, a consumer sends to a server a playback request for a traceability video of a product via a client; and the server automatically matches a customized traceability video for the product based on the received video playback request and transmits the traceability video to the corresponding client for playing. This way, the traceability chain information of the corresponding product is provided in a customized manner based on the product purchased by the consumer, thereby improving the authenticity and appeal of the product.

Further, embodiments of the disclosure provide a variety of ways to generate the video playback request by defining the form and trigger timing of the traceability video playback request, thereby optimizing the user experience.

Figure 6:
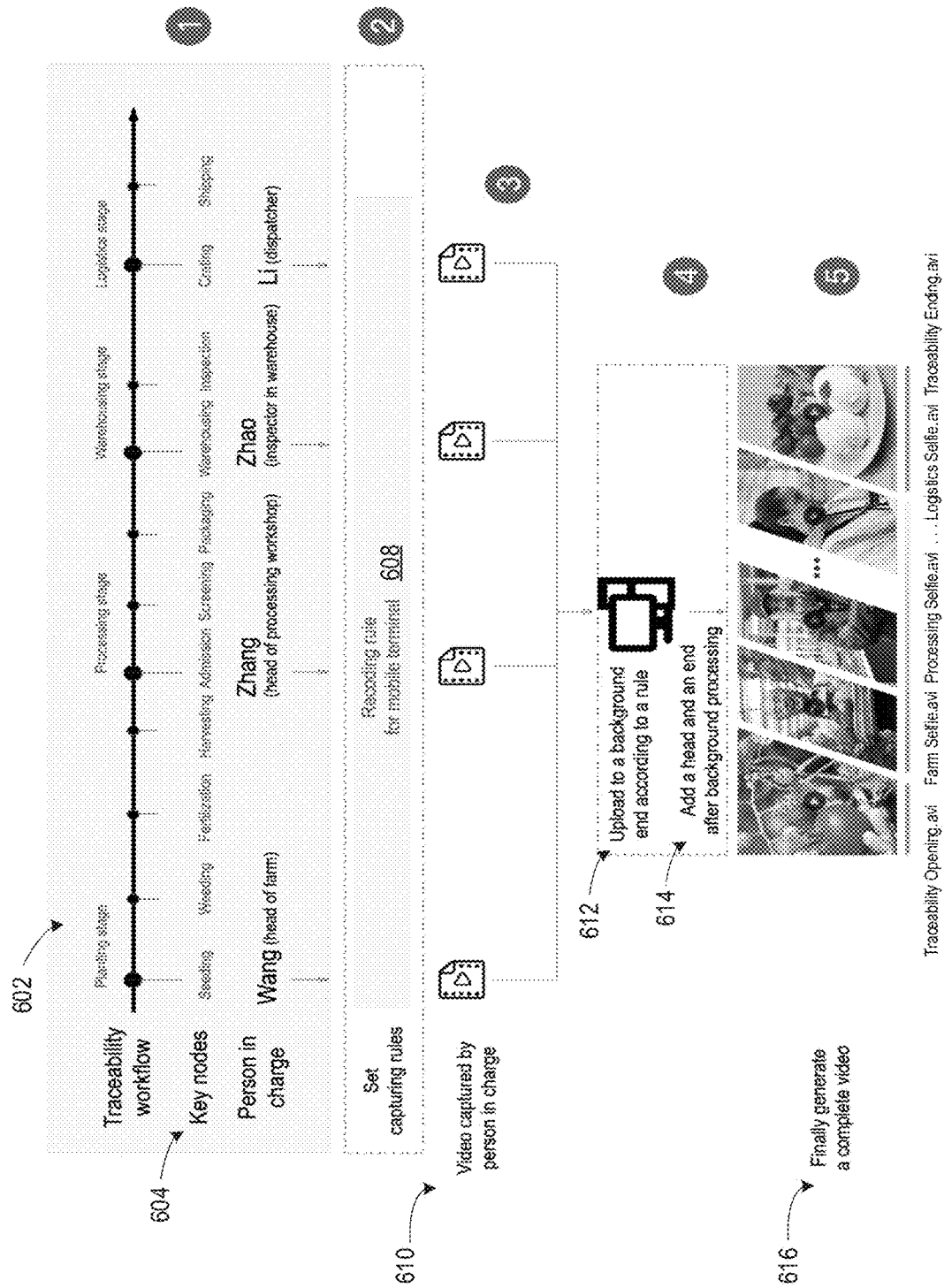
FIG. 6 is a schematic diagram illustrating processing agricultural product traceability chain information according to some embodiments of the disclosure.

FIG. 6 is a schematic diagram illustrating processing agricultural product traceability chain information according to some embodiments of the disclosure. In some embodiments, the execution entity is the server (220) of FIG. 2. As shown herein and in some embodiments, the processing of traceability chain information is illustrated using an agricultural product.

In some embodiments, a designated product includes an agricultural product; and the processing stages of the designated product in the traceability chain comprise a planting stage, a processing stage, a warehousing stage, and a logistics stage for the agricultural product.

As shown herein FIG. 6, in some scenarios, the method for processing traceability chain information of an agricultural product comprises the following steps.

Step 1: divide the traceability chain information of the agricultural product by a plurality of processing stages based on the category of the agricultural product. As shown in the example of FIG. 6, with a fruit-type agricultural product, the process of the fruit-type agricultural product, from manufacturing to sales, is divided into stages (602) of a planting stage, a processing stage, a warehousing stage, and a logistics stage, in which a plurality of processing steps (e.g., key node (604)) are included. For example, as shown in FIG. 6, in the traceability chain information of the fruit-type agricultural product, the planting stage comprises seeding, weeding, fertilization, and harvesting; the processing stage comprises admission, screening, and packaging; the warehousing stage comprises warehousing and inspection; and the logistics stage comprises crating (e.g., packing) and shipping. In various embodiments, the traceability information of the agricultural product is divided by different processing stages based on categories such as fruits, grains, and vegetables of agricultural products.

Steps 2-3: capture videos (610) for the various processing stages in the traceability chain information of the designated agricultural product based on a preset capturing rule (608). In some embodiments, the preset capturing rule includes image and/or video format, image and/or video content, video length, an aspect ratio of the image and/or video, video filter, and light. Further, a unified image and/or video template is provided to ensure consistency of video splicing at later processing stages, thus improving the quality of the videos.

Steps 4-5: upload (612) the pertinent image and/or video information corresponding to the processing stages of the traceability chain of the agricultural product to the server. The server receives the video information and examines the format and content thereof. After the image and/or video information is approved, the system automatically splices image and/or video information of processing stages for different agricultural products and adds a preset traceability opening and closing (614) (e.g., head and end) to generate a complete traceability video after packaging (616).

Step 6 (not shown): when browsing an agricultural product page or a product order page, a consumer sends a video playback request by clicking on a preset video play button on the page. Alternatively, a consumer who has purchased the agricultural product sends a video playback request to the client by scanning a QR code on the product.

Step 7 (not shown): the server receives the video playback request, and searches for the traceability video for the designated agricultural product based on the request, sending the traceability video to the client such that the client plays the video for the consumer.

In some embodiments, the server further periodically generates a traceability video for the designated product and updates the traceability video in use. As a result, it is ensured that the traceability video is timely updated with the corresponding product in real-time to meet users' needs.

According to embodiments of the disclosure, the method for processing product traceability chain information is illustrated with an example of an agricultural product to describe how to provide traceability chain information for a corresponding product in a customized manner, based on the product purchased by a consumer. This way, the authenticity and appeal of the product are improved.

Figure 7:
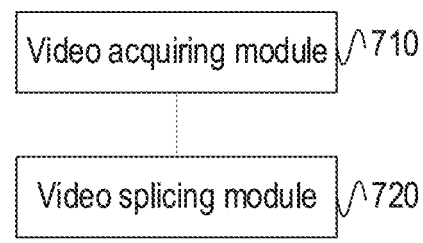
FIG. 7 is a block diagram illustrating an apparatus for processing product traceability chain information according to some embodiments of the disclosure.

FIG. 7 is a block diagram illustrating an apparatus for processing product traceability chain information according to some embodiments of the disclosure. In some embodiments, the apparatus for processing product traceability chain information is provided at the server (104) of FIG. 1 or server (220) FIG. 2, configured to perform the method of FIG. 3. The apparatus comprises a video acquiring module (710) and a video splicing module (720).

The video acquiring module (710) is configured to acquire one or both of pertinent image information and pertinent video information at each processing stage of a traceability chain of a designated product.

The video splicing module (720) is configured to splice the one or both of pertinent image and pertinent video information at each processing stage of the traceability chain of the designated product to generate a traceability video of the designated product.

In some embodiments, the video acquiring module (710) is further configured to receive video information for the designated product, which is captured by a responsible entity for each processing stage of the designated product and meets a preset capturing rule.

In some embodiments, the video splicing module (720) is further configured to add a preset opening and closing to the video generated by splicing the pertinent image and/or video information at each processing stage, generating the traceability video.

According to embodiments of the disclosure, the apparatus for processing product traceability chain information divides a product traceability chain by processing stages, separately captures an image and/or video of each stage, and generates a complete customized traceability video by splicing. Further, a preset capturing rule is adopted for the images and/or videos at the various stages, and/or a preset opening and closing are added to the traceability video. Therefore, unification and standardization of the videos are achieved, thereby reducing costs and improving the completeness and spectator-appealing value for the traceability video.

Figure 8:
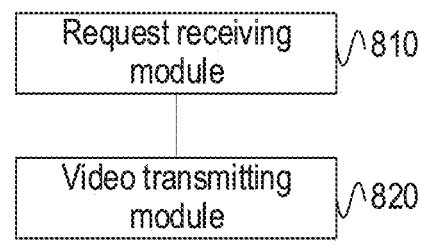
FIG. 8 is a block diagram illustrating an apparatus for processing product traceability chain information according to some embodiments of the disclosure.

FIG. 8 is a block diagram illustrating an apparatus for processing product traceability chain information according to some embodiments of the disclosure. In some embodiment, the apparatus for processing product traceability chain information is provided at the server (104) of FIG. 1, or server (220) of FIG. 2, configured to perform the method of FIG. 4. The apparatus comprises a request receiving module (810) and a video transmitting module (820).

The request receiving module (810) is configured to receive, from a client, a playback request for a traceability video of a designated product.

The video transmitting module (820) is configured to transmit, based on the playback request, to the client a traceability video pre-captured for traceability chain information of the designated product, the traceability video to be played at the client.

In some embodiments, the request receiving module (810) is further configured to receive the playback request generated by the client in response to a playback operation (e.g., click to playback) by a user on a browser page and/or an order page associated with the designated product; and/or receive the playback request generated by the client in response to a user scanning a QR code on the designated product purchased.

Figure 9:
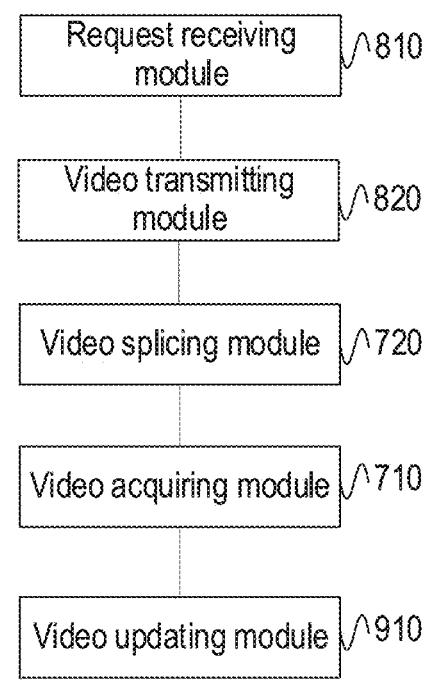
FIG. 9 is a block diagram illustrating an apparatus for processing product traceability chain information according to some embodiments of the disclosure.

FIG. 9 is a block diagram illustrating an apparatus for processing product traceability chain information according to some embodiments of the disclosure. In some embodiments, the apparatus for processing product traceability chain information comprises the apparatus of FIG. 7. In some embodiments and as shown in FIG. 9, the apparatus further comprises a video updating module (910) configured to periodically generate a traceability video for the designated product and update the traceability video in use.

According to embodiments of the disclosure, with the apparatus for processing product traceability chain information, a consumer sends to a server a playback request for a traceability video of a product through a client, and the server automatically matches a customized traceability video for the product based on the received video playback request and transmits the traceability video to the corresponding client for playing. As such, the traceability chain information of the corresponding product is provided in a customized manner based on the product purchased by the consumer, thereby improving the authenticity and appeal of the product.

Figure 10:
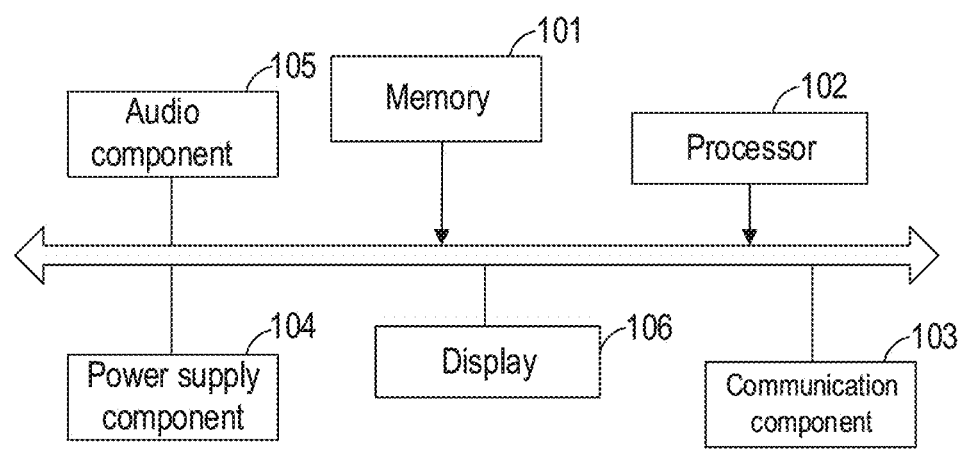
FIG. 10 is a block diagram illustrating an electronic device according to some embodiments of the disclosure.

FIG. 10 is a block diagram illustrating an electronic device based on some embodiments of the disclosure. In some embodiments, the apparatus for processing product traceability chain information above-described in FIG. 7 is implemented by an electronic device. In some embodiments and as shown herein FIG. 10, the electronic device comprises a memory (101) and a processor (102).

The memory (101) is configured to store a program.

In some embodiments, in addition to the program above, the memory (101) is further configured to store various additional data to support operations on the electronic device. Examples of such data include instructions for any application or operation executing on the electronic device, contact data, phonebook data, messages, pictures, videos, etc.

In various embodiments, the memory (101) is implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The processor (102) is configured to be coupled to the memory (101) and to execute a program in the memory (101) to: acquire one or both of pertinent image and pertinent video information at each processing stage of a traceability chain of a designated product; and splice the one or both of pertinent image and pertinent video information at each processing stage of the traceability chain of the designated product to generate a traceability video for the designated product.

According to various embodiments, the processing operations that are substantially similar to the above-described embodiments are not repeated herein.

In some embodiments, as shown in FIG. 10, the electronic device further comprises a communication component (103), a power supply component (104), an audio component (105), a display (106), and other components. FIG. 10 only schematically shows some components of the electronic device and does not mean that the electronic device comprises only the components shown in FIG. 10.

The communication component (103) is configured to facilitate wired or wireless communication between the electronic device and other devices. The electronic device can access a wireless network based on a communication standard, such as Wi-Fi, 2G, 3G, 4G, 5G, 6G, or a combination thereof. In one exemplary embodiment, the communication component (103) receives broadcast signals or broadcast-related information from an external broadcast management system via a broadcast channel. In one exemplary embodiment, the communication component (103) further includes a Near Field Communication (NFC) module to facilitate short-range communications. For example, the NFC module may be implemented based on a radio frequency identification (RFID) technology, an Infrared Data Association (IrDA) technology, an ultra-wideband (UWB) technology, a Bluetooth (BT) technology, and other technologies.

The power supply component (104) supplies power to various components of the electronic device. The power supply component (104) may comprise a power management system, one or a plurality of power sources, and other components associated with the generation, management, and distribution of power for the electronic device.

The audio component (105) is configured to output and/or input audio signals. For example, the audio component (105) comprises a microphone (MIC) configured to receive an external audio signal when the electronic device is in an operating mode, such as a calling mode, a recording mode, and a voice recognition mode. The received audio signals can be further stored in the memory (101) or sent via the communication component (103). In some embodiments, the audio component (105) further includes a speaker configured to output the audio signal.

The display (106) may comprise a screen comprising a Liquid Crystal Display (LCD) and a Touch Panel (TP). If the screen includes the touch panel, then the screen may be implemented as a touch screen to receive input signals from a user. The touch panel includes one or a plurality of touch sensors to sense touches, swipes, and gestures on the touch panel. The touch sensors may not only sense the boundary of a touch or swipe action, but also detect duration and pressure related to the touch or swipe operation.

Figure 11:
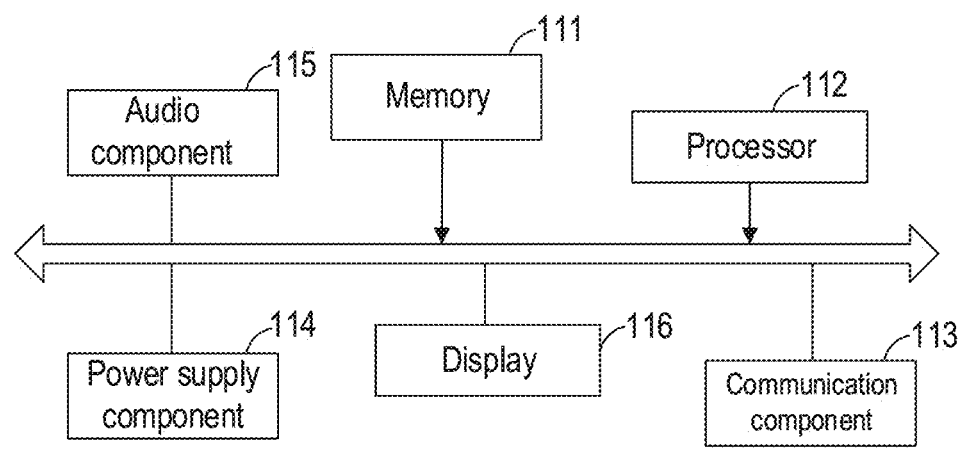
FIG. 11 is a block diagram illustrating an electronic device according to some embodiments of the disclosure.

FIG. 11 is a block diagram illustrating an electronic device according to some embodiments of the disclosure. In some embodiments, the apparatus for processing product traceability chain information above-described in FIG. 8 is implemented by an electronic device. In some embodiments and as shown herein, the electronic device comprises a memory (111) and a processor (112).

The memory (111) is configured to store a program.

In some embodiments, in addition to the program above, the memory (111) is further configured to store various other data to support operations on the electronic device. Examples of the data include instructions for any application or operations executing on the electronic device, contact data, phonebook data, messages, pictures, videos, etc.

In some embodiments, the memory (111) is implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The processor (112) is configured to be coupled to the memory (111) to execute a program in the memory (111) to receive a playback request for a traceability video of a designated product from a client; and transmit, based on the playback request, to the client a traceability video pre-captured for traceability chain information of the designated product, the traceability video to be played at the client.

According to various embodiments, the processing operations that are substantially similar to the above-described embodiments are not repeated herein.

In some embodiments, as shown in FIG. 11, the electronic device further comprises: a communication component (113), a power supply component (114), an audio component (115), a display (116) and other components. FIG. 10 only schematically shows some components of the electronic device, and does not mean that the electronic device comprises only the components shown in FIG. 10.

The communication component (113) is configured to facilitate wired or wireless communication between the electronic device and other devices. The electronic device can access a wireless network based on a communication standard, such as Wi-Fi, 2G, 3G, 4G, 5G, 6G, or a combination thereof. In one exemplary embodiment, the communication component (113) receives broadcast signals or broadcast-related information from an external broadcast management system via a broadcast channel. In one exemplary embodiment, the communication component (113) further includes a Near Field Communication (NFC) module to facilitate short-range communications. For example, the NFC module may be implemented based on a radio frequency identification (RFID) technology, an Infrared Data Association (IrDA) technology, an ultra-wideband (UWB) technology, a Bluetooth (BT) technology, and other technologies.

The power supply component (114) supplies power to various components of the electronic device. The power supply component (114) may comprise a power management system, one or a plurality of power sources, and other components associated with the generation, management, and distribution of power for the electronic device.

The audio component (115) is configured to output and/or input audio signals. For example, the audio component (115) comprises a microphone (MIC) configured to receive an external audio signal when the electronic device is in an operating mode, such as a calling mode, a recording mode, and a voice recognition mode. The received audio signals can be further stored in the memory (111) or sent via the communication component (113). In some embodiments, the audio component (115) further comprise a speaker configured to output the audio signal.

The display (116) may comprise a screen comprising a Liquid Crystal Display (LCD) and a Touch Panel (TP). If the screen includes the touch panel, then the screen may be implemented as a touch screen to receive input signals from a user. The touch panel includes one or a plurality of touch sensors to sense touches, swipes, and gestures on the touch panel. The touch sensors may not only sense the boundary of a touch or swipe action, but also detect duration and pressure related to the touch or swipe operation.

Those skilled in the art can understand that all or part of the steps for implementing the method in above embodiments can be accomplished by hardware related to program instructions. The aforementioned program may be stored in a computer-readable storage medium. In execution, the program executes the steps of the method in the above embodiments, and the foregoing storage medium includes various medium that can store program codes, such as a ROM, a RAM, a magnetic disk, or an optical disc.

It should be finally noted that the above embodiments are merely used for illustrating rather than limiting the technical solutions of the present application. Although the present application is described in detail with reference to the foregoing embodiments, those of ordinary skill in the art should understand that the technical solutions described in the foregoing embodiments may still be modified or equivalent replacement may be made on partial or all technical features therein. These modifications or replacements will not make the essence of the corresponding technical solutions be departed from the scope of the technical solutions in the embodiments of the present application.

The invention claimed is:

1. A method comprising:
   receiving a product identifier associated with a product from a user, the product identifier comprising one of a quick response (QR) code or barcode located on the product and is received by scanning the product;
   determining a plurality of processing stages associated with a traceability chain of the product based on the product identifier, wherein the traceability chain spans multiple entities across a supply chain from manufacturing through distribution, the determining comprising selecting applicable processing stages from the plurality of processing stages based on a category of the product;
   acquiring video information of the product during each of the plurality of processing stages of the traceability chain from the multiple entities at different geographic locations, the video information including an image of the product captured by an entity performing a respective stage of the plurality of processing stages and meeting a preset capturing rule, wherein the preset capturing rule specifies standardized video capture parameters to enable video splicing across the multiple entities; and
   splicing the video information associated with each of the plurality of processing stages received from the multiple entities to generate a traceability video for the product, the traceability video including the applicable processing stages determined based on the category of the product and providing a unified visualization of the products path through the supply chain.

2. The method of claim 1, the splicing the video information comprising adding a preset traceability opening or traceability ending to the traceability video.

3. The method of claim 1, further comprising: transmitting, to a client, the traceability video in response to a playback request received from the client.

4. The method of claim 3, prior to transmitting the traceability video, further comprising at least one of:
   receiving the playback request generated by the client in response to a playback operation by a user; and
   receiving the playback request generated by the client in response to the user scanning the quick response (QR) code on the product.

5. The method of claim 1, further comprising:
   periodically generating a second traceability video for the product; and
   updating the traceability video with the second traceability video.

6. The method of claim 1, the acquiring video information comprising acquiring a plurality of frames of image data.

7. A non-transitory computer-readable storage medium for tangibly storing computer program instructions capable of being executed by a computer processor, the computer program instructions defining steps of:
   receiving an identifier associated with a product from a user, the product identifier comprising one of a quick response (QR) code or barcode located on the product and is received by scanning the product;
   determining a plurality processing stages associated with a traceability chain of the product; based on the identifier, wherein the traceability chain spans multiple entities across a supply chain from manufacturing through distribution, the determining comprising selecting applicable processing stages from the plurality of processing stages based on a category of the product;
   acquiring video information of the product during each of the plurality of processing stages of the traceability chain from the multiple entities at different geographic locations, the video information including an image of the product captured by an entity performing a respective stage of the plurality of processing stages and meeting a preset capturing rule, wherein the preset capturing rule specifies standardized video capture parameters to enable video splicing across the multiple entities; and
   splicing the video information associated with each of the plurality of processing stages received from the multiple entities to generate a traceability video for the product, the traceability video including the applicable processing stages determined based on the category of the product and providing a unified visualization of the products path through the supply chain.

8. The computer-readable storage medium of claim 7, the splicing the video information comprising:
adding a preset traceability opening or traceability ending to the traceability video.

9. The computer-readable storage medium of claim 7, the computer program instructions further defining the steps of:
transmitting, to a client, the traceability video in response to a playback request received from the client.

10. The computer-readable storage medium of claim 9, prior to transmitting the traceability video, the computer program instructions further defining at least one of the steps of:
receiving the playback request generated by the client in response to a playback operation by a user; and
receiving the playback request generated by the client in response to the user scanning the quick response (QR) code on the product.

11. The computer-readable storage medium of claim 7, the computer program instructions further defining the steps of:
periodically generating a second traceability video for the product; and
updating the traceability video with the second traceability video.

12. The computer-readable storage medium of claim 7, the acquiring video information comprising acquiring a plurality of frames of image data.

13. An apparatus comprising:
a processor; and
a storage medium for tangibly storing thereon program logic for execution by the processor, the stored program logic comprising:
logic, executed by the processor, for receiving an identifier associated with a product from a user;
logic, executed by the processor, for determining a plurality of processing stages associated with a traceability chain of the product, based on the identifier, wherein the traceability chain spans multiple entities across a supply chain from manufacturing through distribution, the determining comprising selecting applicable processing stages from the plurality of processing stages on a category of the product,
logic, executed by the processor, for acquiring video information of the product during each of the plurality of processing stages of the traceability chain from the multiple entities at different geographic locations, the video information including an image of the product captured by an entity performing a respective stage of the plurality of processing stages and meeting a preset capturing rule, wherein the preset capturing rule specifies standardized video capture parameters to enable video splicing across the multiple entities, and
logic, executed by the processor, for splicing the video information associated with each of the plurality of processing stages received from the multiple entities to generate a traceability video for the product, the traceability video including the applicable processing stages determined based on the category of the product and providing a unified visualization of the products path through the supply chain.

14. The apparatus of claim 13, the logic for splicing the video information comprising:
logic, executed by the processor, for adding a preset traceability opening or traceability ending to the traceability video.

15. The apparatus of claim 13, the stored program logic further comprising:
logic, executed by the processor, for transmitting, to a client, the traceability video in response to a playback request received from the client.

16. The apparatus of claim 15, the stored program logic further comprising at least one of:
logic, executed by the processor, for, prior to transmitting the traceability video, receiving the playback request generated by the client in response to a playback operation by a user, and
logic, executed by the processor, for, prior to transmitting the traceability video, receiving the playback request generated by the client in response to the user scanning a quick response (QR) code on the product.

17. The apparatus of claim 13, the stored program logic further comprising:
logic, executed by the processor, for periodically generating a second traceability video for the product, and
logic, executed by the processor, for updating the traceability video with the second traceability video.

* * * * *